United States Patent [19]

Heaton et al.

[11] Patent Number: 4,742,297
[45] Date of Patent: May 3, 1988

[54] PROGRAMMABLE CYCLE METER

[75] Inventors: Robert J. Heaton; Timothy J. O'Rourke, both of Sarasota, Fla.

[73] Assignee: Teleflex Incorporated, Limerick, Pa.

[21] Appl. No.: 913,946

[22] Filed: Oct. 1, 1986

Related U.S. Application Data

[63] Continuation-in-part of Ser. No. 752,802, Jul. 8, 1985, abandoned.

[51] Int. Cl.[4] .............................................. G01D 3/48
[52] U.S. Cl. ..................................... 324/166; 324/160
[58] Field of Search ...................... 73/2; 324/160, 166, 324/174, 163; 360/73; 377/110

[56] References Cited

U.S. PATENT DOCUMENTS

| | | | |
|---|---|---|---|
| 3,832,635 | 8/1974 | Cass | 324/166 |
| 4,140,970 | 2/1979 | Graziano | 324/166 |
| 4,199,719 | 4/1980 | Grob | 324/166 |
| 4,262,641 | 4/1981 | Mosely | 324/166 |
| 4,350,952 | 9/1982 | Holt | 324/166 |
| 4,355,364 | 10/1982 | Gudat | 324/166 |
| 4,380,733 | 4/1983 | Yano | 324/166 |
| 4,437,061 | 3/1984 | Shinozaki | 324/166 |
| 4,491,007 | 1/1985 | Crowdes | 324/166 |

FOREIGN PATENT DOCUMENTS 2064129 6/1981 United Kingdom ................ 324/166

Primary Examiner—Reinhard J. Eisenzopf
Assistant Examiner—Jose M. Solis
Attorney, Agent, or Firm—Reising, Ethington, Barnard, Perry & Milton

[57] ABSTRACT

A programmable cycle meter assembly (17,117) for monitoring a cycling member by receiving an input signal from a transducer (13,113) proportional to the cycles of the monitored member and for indicating various cycle rates by a speedometer or tachometer (36) in linear proportion to a linear array of corresponding frequencies. The assembly includes a circuit (17, 117) which is characterized by a switchable filter means (12,112) which filters out unwanted frequencies above a predetermined frequency of the input signal from the transducer (13,113). a switchable divider (20,120) is used for adjustably dividing the input signal for changing the proportion of the frequency by variable a predetermined ratio to produce a repetitive rate (24,124). A fixed frequency to voltage converter (28,128) converts the repetitive rate adjusted frequency signal (24,124) into a proportional voltage for indicating cycle rate on a meter (36) for various configurations of the cycling member.

27 Claims, 5 Drawing Sheets

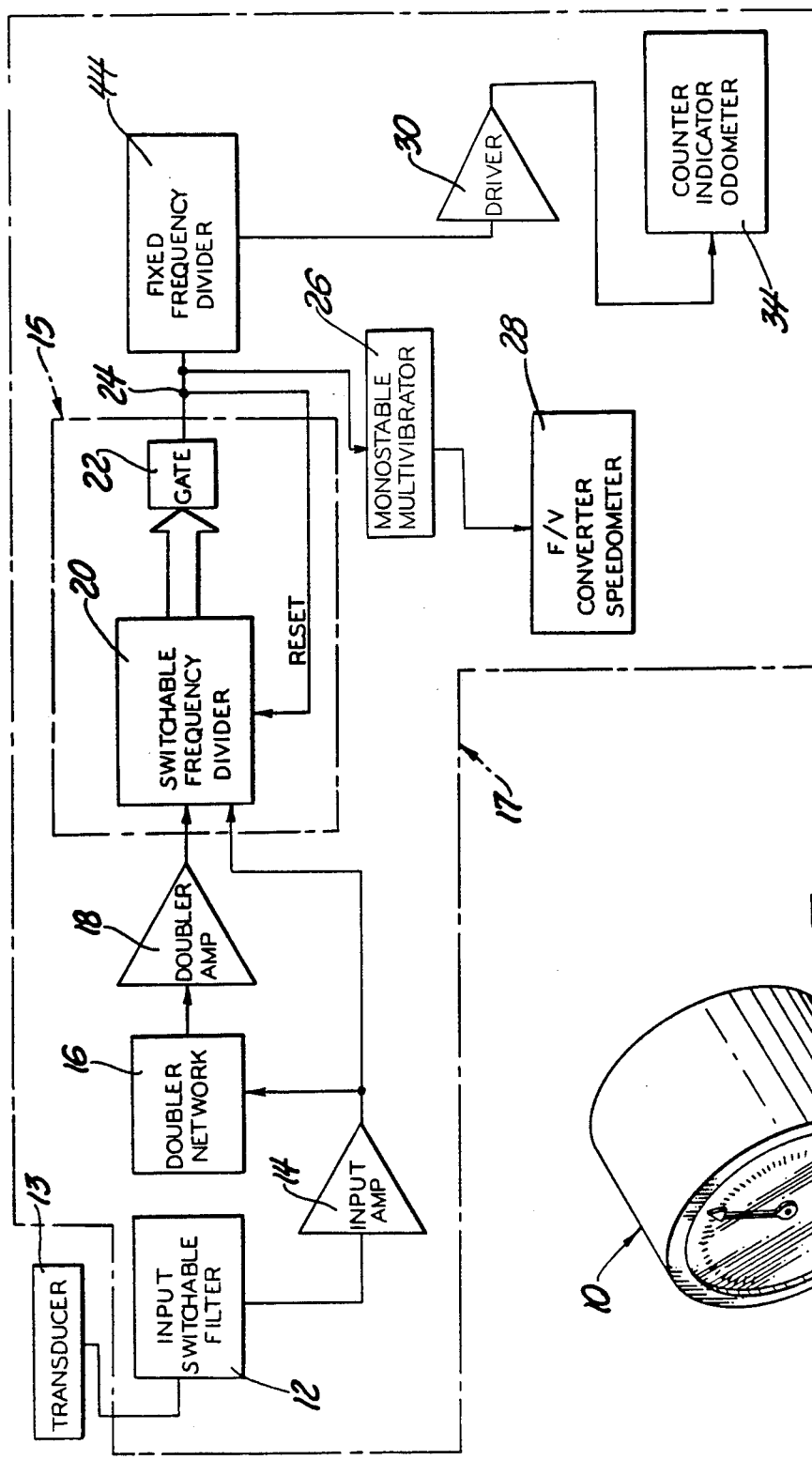

PROGRAMMABLE CYCLE METER

RELATED APPLICATIONS

The following application is a continuation-in-part of Ser. No. 752,802, filed July 8, 1985, which is now abandoned.

TECHNICAL FIELD

The subject invention relates to a programmable meter for monitoring a cycling member to give accurate meter readings of the cycle rate which particularly relates to speedometers/odometers and tachometers/hourmeters.

BACKGROUND ART

In electric speedometers, a transducer is associated with the speedometer cable drive gear in the transmission housing to produce an input signal by a series of pulses from the wheel or drive shaft. A visual indication of the speed and distance traveled from the periodic signal will be visualized since speed and distance traveled are a linear function in regard to the incoming frequency.

Tachometers sense the frequency of pulses from the alternator or magnetic pickup. A visual indication of the cycling rate is provided as a linear function proportional to the incoming frequency.

The problem with such electric speedometers and tachometers is that a change in the gear ratio or tire size of the wheels with regard to speedometers and a change in pulley or belt size with regard to tachometers will alter the calibration of the respective meter rendering them inaccurate until recalibrated. The vehicle manufacturer must stock a different speedometer unit for each tire size and/or axle ratio and a different tachometer for each pulley size and/or belt size. Adjustments may be made within the speedometer and tachometer units themselves, but require precision adjustment and calibration. Moreover, a separate adjustment of the odometer range may be necessary. The adjustments require sophisticated operator training, tools, and calibration equipment not normally available outside of the factory. Also, other systems employing adjusting mechanisms are relatively complex and costly.

STATEMENT OF INVENTION AND ADVANTAGES

A programmable cycle meter assembly monitors a cycling member to provide accurate meter readings for various configurations affecting the cycling member. A display means indicates various cycle rates. An input signal means is used for producing an input signal with frequency proportional to cycle repetition of a monitored cycling member. A switchable filter means filters out unwanted frequencies in the input signal which are above a predetermined frequency producing a filtered frequency signal and for adjustment to different predetermined frequencies. An adjustment means is used for changing the frequency of the filtered frequency signal by a predetermined ratio to produce a repetitive rate adjusted frequency signal. A frequency to voltage converter is used for converting the adjusted frequency signal into a proportional voltage applied to the display means for indicating cycle rate to provide accurate meter readings for various configurations affecting the cycling member utilizing a single meter.

Accordingly, a single speedometer/odometer and/or tachometer/hourmeter utilizing the subject invention may be substituted for the existing speedometer/odometer and/or tachometer/hourmeter. Only a simple portioning of input frequency values is needed for calibration and setting of the adjustment means without special tools, training, or calibration equipment. Consequently, a single unit may be stocked and used for various different axles, tire sizes, etc.

FIGURES IN THE DRAWINGS

Other advantages of the present invention will be readily appreciated as the same becomes better understood by reference to the following detailed accompanying drawings wherein:

FIG. 1 is a perspective view of the subject invention;

FIG. 2 is a schematic block diagram of a first embodiment of the subject invention;

DESCRIPTION OF THE PREFERRED EMBODIMENT

Figure 3:
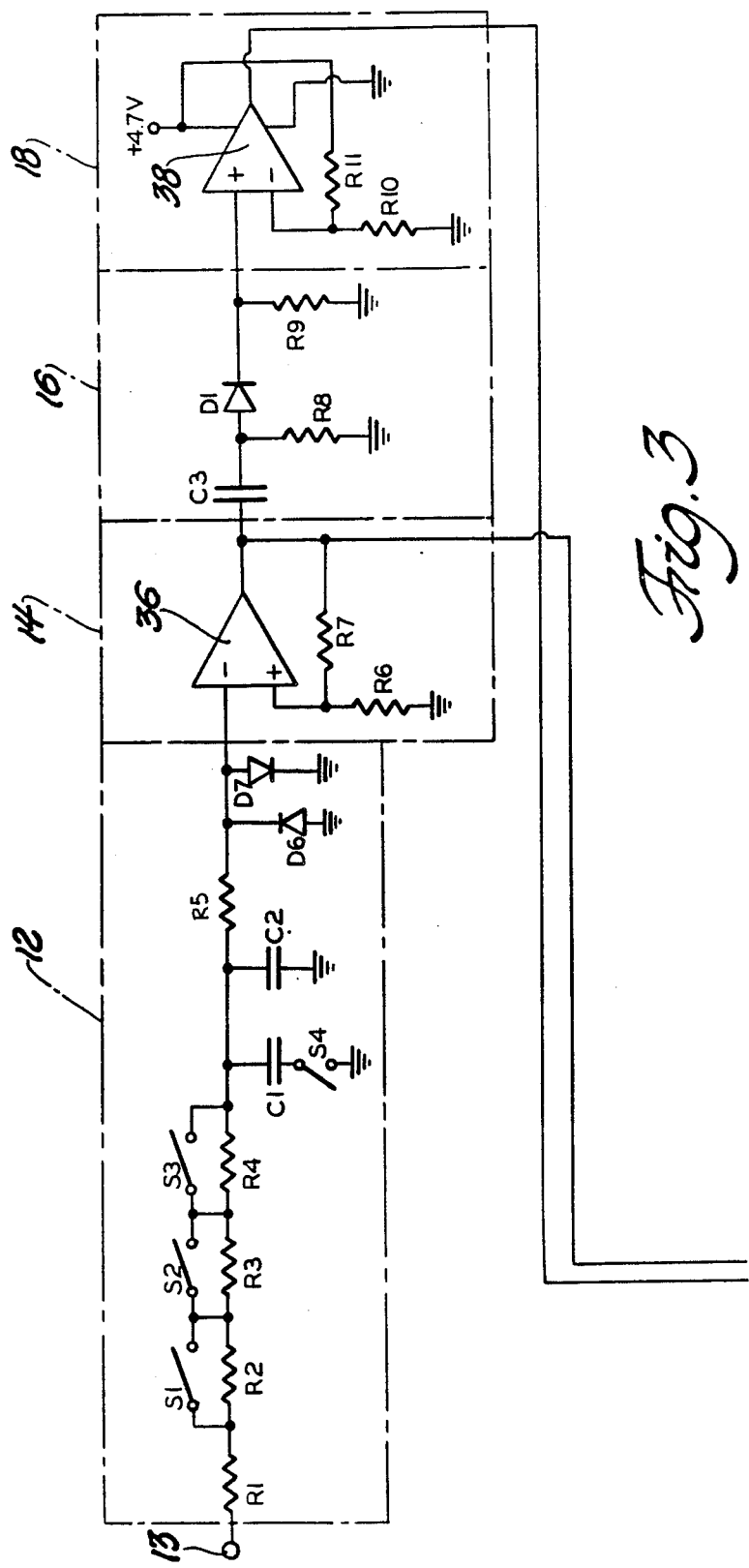
FIG. 3 is a circuit diagram of a portion of the first embodiment.

A programmable cycle meter assembly is generally shown at 10 in FIG. 1. The assembly 10 includes an input signal means or transducer 13, 114, indicated in FIGS. 2 and 5, for producing an array of one and more input frequencies or input signal with frequency proportional to the cycles of a monitored cycling member. The assembly 10 also includes display means or meter 36 for indicating various cycle rates in linear proportion to the array of input frequencies. In other words, the display means 36 could be a conventional speedometer or tachometer for indicating various rates, either digital or analog.

The assembly 10 includes a circuit, generally indicated at 17 and 117, for changing an input signal from the transducer 13, 113 into a signal in linear proportion for indication by the display means 36. A switchable filter means 12, 112 receives the array of input frequencies and filters out unwanted frequencies above a predetermined frequency producing a filtered frequency signal. The switchable filter means 12, 112, is a simple low-pass, single-pole filter, which filters out unwanted signals above the predetermined frequency. The switchable filter means 12,112 is adjustable to vary the predetermined frequency in relationship to the configuration of the cycling member. The switchable filter 12, 112 is used as opposed to a fixed frequency filter to filter out frequencies above the highest possible frequency of a particular cycling member. Therefore, if a cycling member is used having a much lower frequency range, i.e. a larger belt size, the filter can be appropriately adjusted to filter out frequencies just above the range, as opposed to a cycling member having a higher frequency range. The switchable filter 12, 112 uses a series of filter resistors R1-R4, R102-R106 for receiving the array of input frequencies and a series of filter switches S1-S3, S102-S104 wherein the filter resistors R1-R4, R102-R106 and the filter switches S1-S3, S102-S104 are parallel so that one filter switch is parallel with one of the series of filter resistors R1-R4, R102-R106 for closing and opening to obtain a required impedance resistance of the filter 12, 112. Filter capacitors C1, C2, C101, C102 are connected to the output of the series of filter resistors R1-R4, R102-R106 and a parallel switch S4, S101 is in series with and between the first of the filter capacitors C1, C101 for changing the total capacitance of the filter 12, 112 wherein the total resistance and the capacitance determines the cutoff frequency above which are unwanted frequencies of the filter 12, 112.

An input amplifier means 14, 114 is used for amplifying the filtered frequency signal to a predetermined potential level producing an amplified input signal. In other words, the amplifier means 14, 114 amplifies the magnitude of the filtered frequency signal to a predetermined potential level.

The circuit 17, 117 further includes adjustment means 15, 115 which changes the proportion of the frequency of the amplified input signal by a predetermined ratio to produce a repetitive rate adjusted frequency signal 24, 124. The adjustment means 15, 115 is adjustable to vary the predetermined ratio in relationship to the configuration of the cycling member. The adjustment means 15, 115 establishes the linear proportional signal in response to various arrays of input frequencies whereby a single meter 36 is utilized to provide accurate meter readings for various configurations of the cycling member. The input frequencies will change depending on the gear ratio or tire size for the speedometer, and the pulley or belt size for the tachometer used, wherein the drive gear, alternator or magnetic pickup are considered the cycling member respective with the meter embodiment used. In other words, regardless of the full-scale frequency of the given speedometer or tachometer 36, the adjustment means 15, 115 will correct the various incoming frequencies due to different configurations of the cycling member to provide the equivalent frequency corresponding with the speedometer or tachometer 36 used.

The adjustment means 15, 115 includes a switchable divider 20, 120 for dividing the amplified input signal to produce the repetitive rate adjusted frequency signal 24, 124. The predetermined ratio is selected based on the configuration of the cycling member to calibrate and adjust the frequency to be within a specified range. The switchable frequency divider 20, 120 uses a counter 40, 140 for dividing the amplified input signal and a series of pull-up resistors R23-R30, R110-R112 and respective divider switches S5-S12, S6-S8 for receiving the divided signal to determine the predetermined ratio to produce the respective rate adjusted frequency signal 24, 124.

Figure 4:
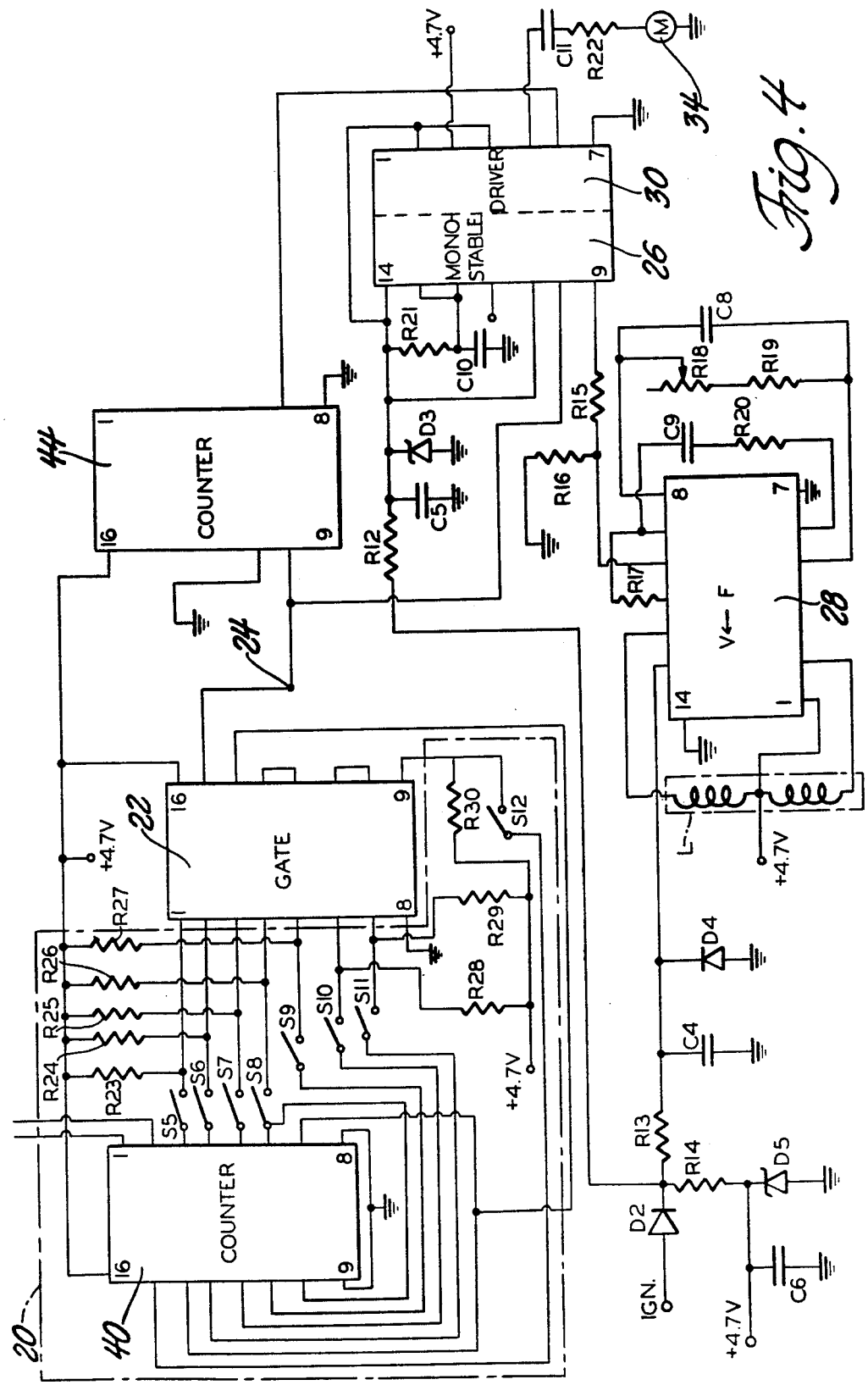
FIG. 4 is a circuit diagram of the remaining portion of the first embodiment.
Figure 6:
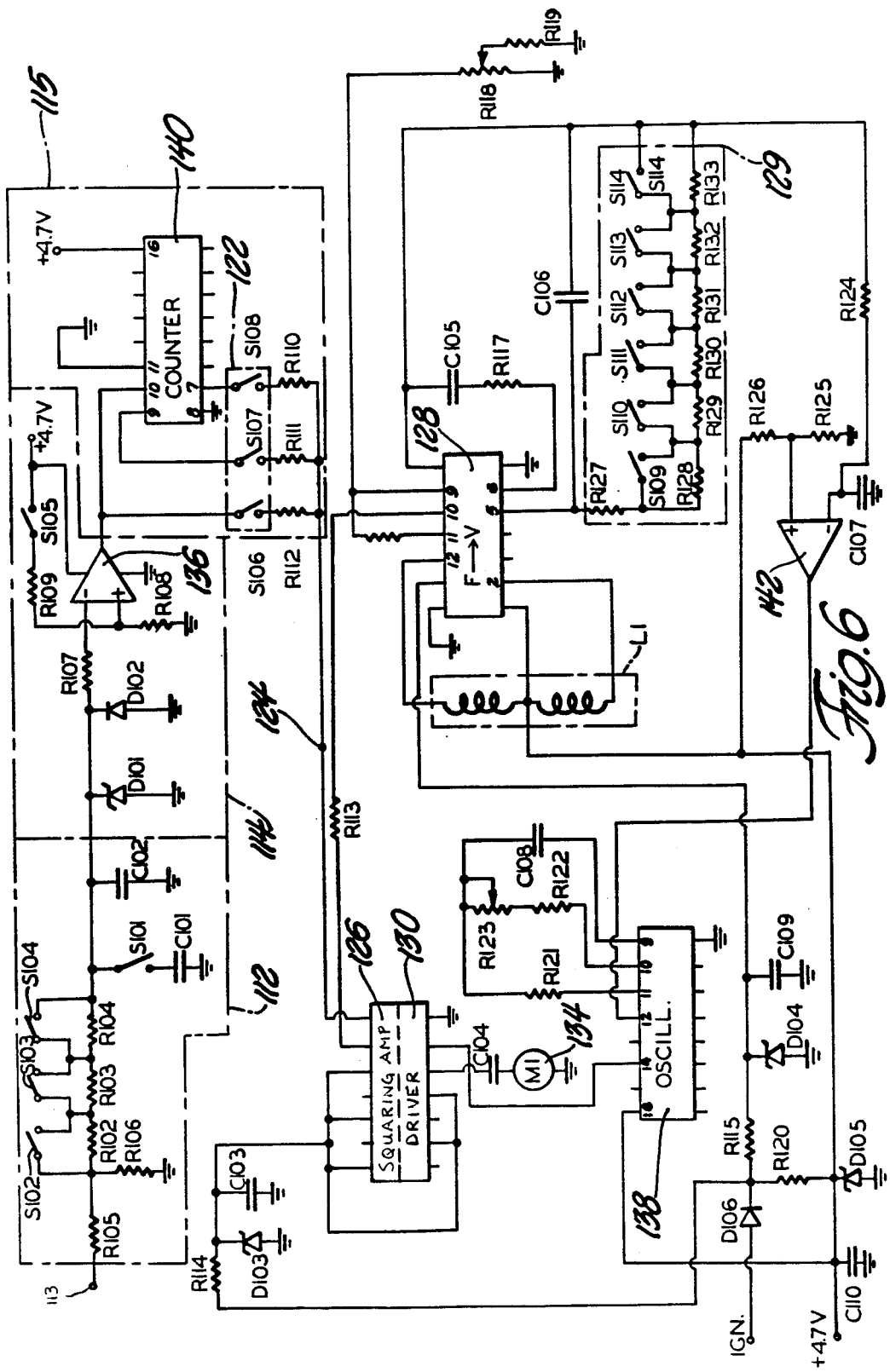
FIG. 6 is a circuit diagram of the second embodiment.

A fixed signal conditioner 26, 126 receives the repetitive rate signal 24, 124 for operating a frequency to voltage converter 28, 128. The fixed frequency to voltage converter 28, 128 is used for converting the adjusted frequency signal 24, 124 into a proportional or drive signal which is applied to the meter or display means 36 for indicating cycle rate to provide accurate meter readings for various configurations of the cycling member. As shown in FIGS. 4 and 6, the signal may be applied to a coil L, L1 to change the meter reading.

There are two circuit embodiments of the subject invention which implements the above described cycle meter. The first embodiment 17 (FIGS. 2-4) is used as a speedometer, and the second embodiment 117 (FIGS. 5, 6) is used as a tachometer.

The first embodiment 17 is used as a speedometer which effectively measures vehicle speed and includes an odometer 34 for measuring distance. In the first embodiment 17, the switchable filter means 12 receives the array of input frequencies from the transducer 13 and filters out unwanted signals above the filtered frequency signal from the input signal means 13 producing the filtered frequency signal to the input amplifier means 14. The switchable filter means 12 comprises the series filter resistors R1, R2, R3, R4, the series of filter switches S1, S2, S3, first and second filter capacitors C1, C2, the parallel switch S4, for selectively filtering out unwanted frequencies, a fifth resistor R5 and a pair of diodes D7, D6 for limiting the voltage level. There are four resistors in the series of filter resistors R1-R4 and three switches in the series of filter switches S1-S3.

The input amplifier means 14 amplifies the magnitude of the filtered frequency signal to a predetermined potential level producing the amplified input signal. The input amplifier means 14 comprises an input op-amp 36, a sixth resistor R6 interconnecting the input op-amp 36 and the ground potential and a seventh resistor R7 as feedback.

The first embodiment 17 includes a doubler network 16 and doubler amplifier 18, which is a frequency multiplex means, for doubling the frequency of the amplified input signal from the input amplifier means 14, allowing the circuit 17 to operate at lower frequencies, and else reduces the digital programming error by a factor of two. For higher order input frequencies, the doubler network 16 and doubler amplifier 18 are optional. The doubler network 16 and doubler amplifier 18 comprise a doubler op-amp 38, a differentiating circuit including a third capacitor C3 and eighth resistor R8, a half wave rectifier with a first D1 and a ninth resistor R9, and two biasing resistors R10, R11 for multiplying the input frequency by a factor of two. In other words, two signals delayed or being time offset from one another are produced in response to each single pulse of the amplified input signal.

The adjustment means 15 receives the amplified input signal from the doubler 16, 18 or the input amplifier 14. The adjustment means 15 includes the switchable frequency divider means 20 for dividing the array of input frequencies from the input signal means 13 to a variable frequency 24. In other words, the switchable frequency divider means 20 divides down the higher order input frequencies from the input signal means 13 to frequencies as the designer deems necessary at 24. The divider means 20 can be binary-coded decimal (BCD), straight binary or possibly another coded divider. The length of the divider chain of the divider means 20 is determined by the input frequencies and the desired repetition rate at 24. The switchable divider means 20 comprises the counter 40, eight of the series of divider switches S5, S6, S7, S8, S9, S10, S11, S12, and eight of the series of pull-up resistors R23, R24, R25, R26, R27, R28, R29, R30 for selectively dividing down an incoming frequency. The switchable divider means 20 includes a gate 22 for receiving the variable frequency from the divider means 20 producing the repetitive rate adjusted frequency signal 24. The gate 22 provides a reset return signal to the counter 40 of the divider means 20 to reset the counter 40 (in our case, to zero) to reinitialize the sequence. Furthermore, the gate 22 provides the repetitive rate adjusted frequency 24 at any given mph or kph reading for any given speedometer or speedometer/odometer. The gate 22 comprises a logic AND gate 22. The counter 40 may receive the output from the input amplifier 14 and the output of the doubler frequency network 16, 18 which send the amplified input signal and a time delayed differentiated pulse creating the doubled frequency effect.

The fixed frequency to voltage converter 28 converts the repetitive rate adjusted frequency signal 24 into a proportional signal for the display means 36 to indicate the cycle rate. In other words, the fixed frequency to voltage converter 28 can be any converter capable of accepting a frequency-changing signal and converting it into a signal proportional to the input frequency. The coil L1 is driven by the frequency to voltage converter 28. A seventeenth resistor R17 is connected between pins 9 and 11. A ninth capacitor C9 and twentieth resistor R20 connects between pins 9 and 16. A variable resistor R18 and nineteenth resistor R19 are parallel with an eighth capacitor C8 and are across pins 8 and 5.

The fixed signal conditioner 26 includes a monostable multivibrator 26 for operating the frequency to voltage converter 28. Power is supplied to the converter 28 through a twelfth resistor R12, parallel fifth capacitor C5, parallel third zener diode D3, and a twenty-first resistor R21 between pins 13 and 14 and a tenth capacitor C10 to ground used for timing.

The first embodiment 17 also includes a fixed counter 34 for indicating total cycles of the cycling member. The counter 34 is a mechanical stepper motor driven counter, although any other indicator could be utilized. Also included for operating the fixed counter 34 is fixed frequency divider means 44 for dividing the repetitive rate adjusted frequency signal 24 by a predetermined relationship for operation the fixed counter 34 from the respective rate adjusted frequency signal 24. The fixed divider means 44 will divide the signal proportionately to supply the fixed counter 34 at the correct frequency. The fixed divider means 44 comprises a counter 44 which is a binary counter although another type of divider can be used. A driver means 30 supplies current gain between the fixed frequency divider means 26 and the fixed counter 34. An eleventh capacitor C11 and twenty-second resistors R22 are in series between the driver 30 and counter 34.

A power supply circuit for supplying power to the first embodiment includes a sixth capacitor C6 parallel with the power source, a zener diode D5 in parallel with the sixth capacitor, a second diode D2 connected to ignition power (IGN), and a fourteenth resistor connected between the second diode D2 and zener diode D5. Power is supplied to the frequency to voltage converter 28 through a thirteenth resistor R13 connected to said second diode D2 and a parallel capacitor C4, and a parallel diode D4 connected to pin 12. Power is supplied to the monostable multivibrator 26 by a connection between the second diode D2 and twelfth resistor R12.

Figure 5:
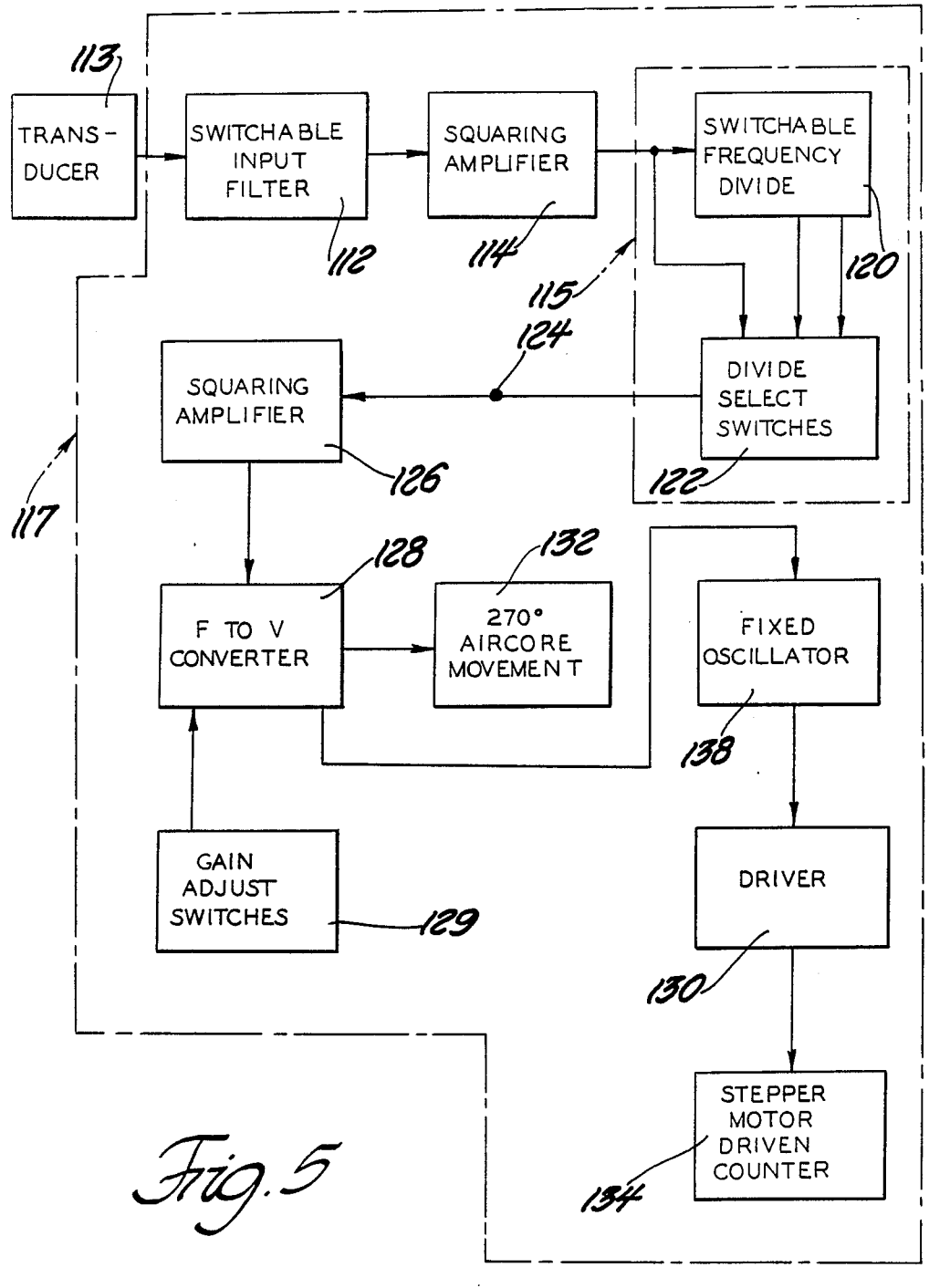
FIG. 5 is a schematic block diagram of a second embodiment of the subject invention.

The second embodiment 117 shown in FIG. 5 is used as a tachometer and includes an hourmeter for indicating run time. The transducer 113 is connected to the switchable input filter 112 which filters out unwanted frequencies above the predetermined producing a filtered signal. The switchable filter 112 comprises the series of filter resistors R102-R106 which includes an input resistor R105 for receiving the array of input frequencies, a parallel input resistor R106 is connected to the input resistor R105 and ground, and a series of three resistors R102, R103, R104 with the first resistor R102 connected to the parallel input resistor R106. The series of filter switches include three switches S102, S103, S104 with one across and parallel with each of the series of filter resistors R102, R103, R104 for opening and closing to vary the resistance of the switchable filter 112. The parallel switch S101 is connected to the last of the series of three resistors R102, R103, R104 and a first of the filter capacitors C101 is connected to the parallel switch S101 and ground wherein the single switch S101 is opened and closed to vary the capacitance of the switchable filter 112. A second of the filter capacitors C102 is in parallel with the first filter capacitor C101, and a first zener diode D101 and first diode D102 are in parallel with the second filter capacitor C102.

The input amplifier 114 is a squaring amplifier which square the magnitude of the filtered signal producing an amplified input signal. The input amplifier 114 includes a first operational amplifier 136. A first biasing resistor R107 is connected to the first diode D102 and a first operational amplifier 136, a second biasing resistor R108 is connected to the first op-amp 136 and ground, a third biasing resistor R109 is in series with a fifth switch S105 and the power supply for determining the differential of the first operational amplifier 136.

The adjustment means 115, which includes the switchable frequency divider 120, receives the amplified input signal and divides the frequency of the amplified input signal to the adjusted frequency signal 124 proportional to the array of input frequencies. The switchable divider 120 uses a counter 140 to realize each of the predetermined ratios from which one is selected. Divide select switches 122 are used to select the single predetermined ratio for use in the calibrated meter dependent on the cycling member configuration. The adjustment means 115 includes the counter 140 with the input connected to the output of the first operational amplifier 136. The series of divider switches and divider resistors including a sixth switch S106 and a first limiting resistor R112 are connected to the output of the first operational amplifier 136 and the output of the adjustment means 115 for dividing the amplified input signal by "1" when the sixth switch S106 is closed. A seventh switch S107 and a second limiting resistor R111 are connected to a first output of the counter 140 and the output of the adjustment means 115 for dividing the amplified input signal by "2" when the seventh switch S107 is closed. An eighth switch S108 and third limiting resistor R110 are connected to a second output of the counter 140 and the output of the adjustment means 115 for dividing the amplified signal by "4" when the eight switch S108 is closed. One of the switches S106, S107, S108 is closed in correlation with the configuration of he cycling member used.

The fixed ratio signal conditioner 126 receives the adjusted frequency signal. The fixed signal conditioner 126 is a second squaring amplifier 126 which square the magnitude of the adjusted frequency signal 124 to drive the frequency to voltage converter 128. The signal conditioner or second squaring amplifier 126 is implemented using an integrated circuit timer. The second squaring amplifier 126 receives the signal from the adjustment means 115 and sends a signal of increased voltage to the frequency to voltage converter 128.

The frequency to voltage converter 128 converts the amplified adjusted frequency signal 124 into a proportional signal which is applied to the display means 36 for indicating cycle rate. The frequency to voltage converter 128 includes three resistors R116, R118, R119 used to calibrate the frequency to voltage converter 128. A seventeenth resistor R117 and two capacitors C105, C106 are used to convert the voltage drive to a current drive the aircore of the meter 36 through windings L1.

The second embodiment 117 includes gain adjust switches 129 for varying the gain of the frequency to voltage converter 128 to operate the meter 36. The gain is set at a value dependent on the configuration of the cycling member. The programmable gain adjust switches 129 includes a series of seven resistors R127, R128, R129, R130, R131, R132, R133 and six switches S109, S111, S112, S113, S114 with each parallel and across six of the series of seven resistors R128, R129, R130, R131, R132, R133 and connected to the frequency to voltage converter 128 for adjusting the gain of the frequency to voltage converter 128 by closing any of the six switches S109, S110, S111, S112, S113, S114. The analog signal from the frequency to voltage converter 128 drives an aircore whose movement operates the meter 36. The switchable filter 112, adjustment means 115, and the gain adjust switches 129 are easily adjusted on a tachometer to calibrate the meter 36 when different pulley or belt sizes are used.

FIG. 6 also includes the circuitry for an hourmeter. The hourmeter includes a hold off signal from the frequency to voltage converter 128 detected by a second op amp 142. An oscillator 138 receives the hold off signal. A driver 130 drives the stepper motor 134 for hourmeter indication.

The hourmeter circuitry for the second embodiment includes the second op amp 142 with the inverting input connected to the gain adjust switches 122 through an input limiting resistor R124 and parallel with a capacitor C107 and non-inverting input connected by a voltage divider R125, R126, an oscillator means 138 for receiving the output of the second op amp 142 as a reset, an oscillator capacitor C108 and three resistors R121, R122, R123 for setting the oscillator frequency, a driver 130 connected to the output of the oscillator means 138 to act as a driver, and a meter capacitor C104 and stepper motor meter 134 for indicating hours.

A power supply circuit for supplying power to the second embodiment includes a tenth capacitor C110 parallel with the power source, a zener diode D105 in parallel with the tenth capacitor C110, a sixth diode D106 connected to the ingition power (IGN), a twentieth resistor R120 connected between the power source and ignition power, a fifteenth resistor R115 connected to the sixth diode D106, a parallel zener diode D104 and ninth capacitor C109 connected to the fifteenth resistor R115 for supplying the frequency to voltage converter 128, a fourteenth resistor R114 connected to the sixth diode D106, a third zener diode D103 connected to the fourteenth resistor R114 and a third capacitor C103 connected to the fourteenth resistor R114 for supplying power to the to the squaring amplifier 126 and the driver 130.

The following are values for the various components which may be used in a circuit made in accordance with the first and second embodiments, it being understood that the value are exemplary and various combinations of values may be used in the various components utilized in practicing the invention.

LIST OF COMPONENTS

| Resistors | Value (ohms) |
|---|---|
| R113, R115 | 51 |
| R12, R14, R114, R120 | 100 |
| R2 | 200 |
| R3, R20, R117 | 470 |
| R128 | 856 |
| R1, R6, | 1K |
| R2 | 1.1K |
| R129 | 1.72K |
| R4 | 1.8K |
| R102, R116 | 2K |
| R17 | 2.4K |
| R119 | 2.7K |
| R7 | 3.3K |
| R130 | 3.44K |
| R15, R16, R103, R108, R109 R110, R111, R112, R113 | 5.1K |
| R131 | 6.9K |
| R5, R8, R9, R10, R106, R107, R124 | 10K |
| R132 | 13.8K |
| R118, R123 | 22K |
| R104 | 27K |
| R133 | 27.4K |
| R105 | 33K |
| R127 | 41.2K |
| R18 | 75K |
| R122 | 132K |
| R19, R125, R126 | 750K 56 |
| R101 | 150K |
| R121 R134 | 2.7M |

| Capacitors | Value (Microfarads) |
|---|---|
| C3 | .047 |
| C108 | .0082 |
| C101, C102 | .015 |
| C1, C2, C105, C9 | .068 |
| C10 | .1 |
| C106 | 2.2 |
| C8 | 4.7 |
| C5, C6, C103, C107, C110 | 10 |
| C4, C109 | 47 |
| C11, C104 | 100 |

| Diodes | Type |
|---|---|
| D5, D101, D105, | IN4732A |
| D1, D2, D6, D7, D102, D106 | 1N4004 |
| D3, D103 | IN4738A |
| D4, D104 | IN4746A |
| Frequency to Voltage Converter | |
| 28, 128 | CS 189 |
| Counters | |
| 40 | MC 14518 |
| 44, 140 | CD 4040 |
| 138 | SCL 4060 |
| Logic Gate | |
| 2 | MC 14501 |
| Op-Amps | |
| 36 | LM358 |
| 38 | LM358 |
| 136, 142 | LM358 |
| Other I.C. Chips | |
| 26, 30, 126, 130 | NE 556P |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A programmable cycle meter assembly (10) for monitoring a cycling member to provide accurate meter readings for various configurations affecting the cycling member, said assembly (10) comprising; display means (36) for indicating various cycle rates, input signal means (13, 113) for producing an input signal with frequency proportional to cycle repetition of a monitored cycling member, a switchable filter means (12, 112) for filtering out frequencies in said input signal which are above a predetermined frequency producing a filtered frequency signal and for adjustment to different predetermined frequencies, adjustment means (15, 115) for changing the frequency of said filtered frequency signal from said switchable filter means (12, 112) by a predetermined ratio to produce a repetitive rate adjusted frequency signal (24, 124), a frequency to voltage converter (28, 128) for converting said adjusted frequency signal (24, 124) into a drive signal applied to said display means (36) for indicating cycle rate to provide accurate meter readings for various configurations affecting said cycling member.

2. An assembly as set forth in claim 1 including an input amplifier means (14, 114) for amplifying the magnitude of said filtered frequency signal from said switchable filter means (12, 112) to a predetermined potential level producing the amplified input signal.

3. An assembly as set forth in claim 2 wherein said adjustment means (15, 115) includes a switchable frequency divider (20, 120) for dividing said amplified input signal from said input amplifier means (14,114) to said adjusted frequency signal (24,124) with a frequency proportional to said input signal.

4. An assembly as set forth in claim 3 further including a fixed signal conditioner (26,126) for receiving said adjusted frequency signal to operate said frequency to voltage converter (28,128).

5. An assembly as set forth in claim 4 further characterized by said switchable filter (12,112) including a series of filter resistors (R1-R4, R102-R105) for receiving said array of input frequencies, a series of filter switches (S1-S3, S102-S104) wherein one is parallel with one of said series of filter resistors R1-R4, R102-R105) for closing and opening to obtain a required impedance resistance of said filter (12,112), first and second filter capacitors (C1, C2, C101, C102) connected to the output of said series of resistors R1-R4, R102-R106), and a parallel switch (S4, S101) in series with and between the first of said filter capacitors (C2, C101) for changing the total capacitance of said filter (12,112) wherein said total resistance and said capacitance determines the cutoff frequency above which are unwanted frequencies of said filter (12,112).

6. An assembly as set forth in claim 5 further characterized by said switchable frequency divider (20,120) including a counter (40,140) for dividing said amplified input signal, a series of divider resistors (R23-R30, R110-R112) and respective divider switches (S5-S12, S106-S108) receiving said divided signal for determining said predetermined ratio to produce said adjusted frequency signal (24,124).

7. An assembly as set forth in claim 6 further characterized by said fixed signal conditioner (26) including monostable multivibrator means (26) for squaring said adjusted frequency signal to operate said fixed frequency to voltage converter (28).

8. An assembly as set forth in claim 7 wherein said adjustment means (15) includes a gate (22) for receiving the output from said switchable frequency divider means (20) producing said repetitive rate adjusted frequency (24).

9. An assembly as set forth in claim 8 including a frequency multipler means (16,18) to receives said filtered frequency signal for increasing resolution and for producing an amplifier frequency signal.

10. An assembly as set forth in claim 9 further including a fixed counter (34) for indicating total cycles of said cycling member.

11. An assembly as set forth in claim 10 further including a fixed frequency divider means (44) for dividing said adjusted frequency signal by a fixed ratio for operation of said fixed counter (34).

12. An assembly as set forth in claim 11 including driver means (30) to supply current gain between said fixed frequency divider means (44) and said fixed counter (34).

13. An assembly as set forth in claim 12 further characterized by said switchable filter means (12) including said series filter resistors (R1, R2, R3, R4), said series of filter switches (S1, S2, S3), said first and second filter capacitors (C1, C2), said parallel switch (S4), for selectively filtering out unwanted frequencies, a fifth resistor (R5) and a pair of diodes (D7, D6) for limiting the voltage level, wherein said series of filter resistors (R1-R4) includes four resistors and said series of filter switches (S1-S3) includes three switches.

14. An assembly as set forth in claim 13 further characterized by said fixed divider means (34) including a counter (44) connected to the output of said gate (22) for generating a signal to operate said counter (34).

15. An assembly as set forth in claim 14 further characterized by said input amplifier (14) including an amplifier (36), a sixth resistor (R6) interconnecting the input op-amp (36) and the ground potential, and a seventh resistor (R7) as feedback.

16. An assembly as set forth in claim 15 further characterized by said doubler means (16,18) including a doubler op-amp (38), a differentiating circuit including a third capacitor (C3) and eighth resistor (R8), a half wave rectifier with a first (D1) and a ninth resistor (R9), and two biasing resistors (R10, R11) for multiplying the input frequency by a factor of two.

17. An assembly as set forth in claim 6 including programmable gain adjust switches (12) for varying the gain of said frequency to voltage converter (128) to operate said meter (36).

18. An assembly as set forth in claim 17 further characterized by said fixed signal conditioner (126) including a squaring amplifier for amplifying said repetitive rate adjusted frequency (124) to drive said frequency to voltage converter (128).

19. An assembly as set forth in claim 18 further characterized by said switchable filter (112) including a zener diode (D101) and first diode (D102) in parallel with said filter capacitors (C102).

20. An assembly as set forth in claim 19 further characterized by said input amplifier means (114) including a first operational amplifier (136), a first biasing resistor (R107) connected to the first diode (D102) and said first operational amplifier (136), a second biasing resistor (R108) connected to said first op-amp (136) and ground, a third biasing resistor (R9) in series with a fifth switch (s105) and a power supply for determining the differential of the first operational amplifier (136).

21. An assembly as set forth in claim 20 further characterized by said perogrammable gain adjust switch (129) including a series of seven resistors (R127, R128, R129, R130, R131, R132, R133) and six switches (S109, S110, S111, S112, S113, S114) with each parallel and across each of six of said series of seven resistors (R128, R129, R130, R131, R132, R133) and connected to said frequency to voltage converter (128) for adjusting the gain of said frequency to voltage converter (128) by closing any of said six switches (S109, S110, S111, S112, S113, S114).

22. An assembly as set forth in claim 21 further characterized by said adjustment means including said counter (140) with the input connected to the output of said first operational amplifier (136) and said divider resistors (R110–R112) and switches (S106–S108) including a sixth switch IR106) and resistor (R112) connected to the output of said first operational amplifier and the output of said adjustment means for dividing the amplified input signal by one when the sixth switch is closed, a seventh switch (S107) and resistor (R111) connected to a first output of said counter and the output of said adjustment means for dividing the amplified input signal by two when the seventh switch is closed, an eighth switch (S108) and resistor (R110) connected to a second output of said counter and the output of said adjustment means for dividing said amplified signal by 25 for when the eighth switch is closed.

23. An assembly as set forth in claim 22 further including hourmeter means (138, 130, 134) for indicating on-time of said assembly which includes an oscillator (138), a driver (130) and stepper motor (134) for time indication.

24. A method of monitoring a cycling member to provide accurate meter readings for various configurations of the cycling member, the steps of: producing an input signal with frequency proportional to cycle speed of a monitored member, filtering out frequencies from the input signal above a predetermined frequency to produce a filtered frequency signal, adjusting the predetermined frequency in relationship to the configuration of the cycling member, changing the filtered frequency signal by a predetermined ratio to produce a repetitive rate adjusted frequency signal, and converting the adjusted frequency signal into a drive signal applied to said display means applied to said display means for indicating cycle rate to provide accurate meter readings for various configurations affecting said cycling member.

25. A method as set forth in claim 24 further including amplifying the magntiude of the filtered frequency signal to a predetermined potential level producing an amplified input signal.

26. A method as set forth in claim 25 further including dividing said amplified input signal to a variable frequency proportional to the input signal.

27. A method as set forth in claim 26 further including conditioning said repetitive signal for operation of the display means.

* * * * *